April 3, 1962  T. M. RYAN  3,028,517
NEUTRON DETECTOR
Filed Dec. 10, 1958  2 Sheets-Sheet 1
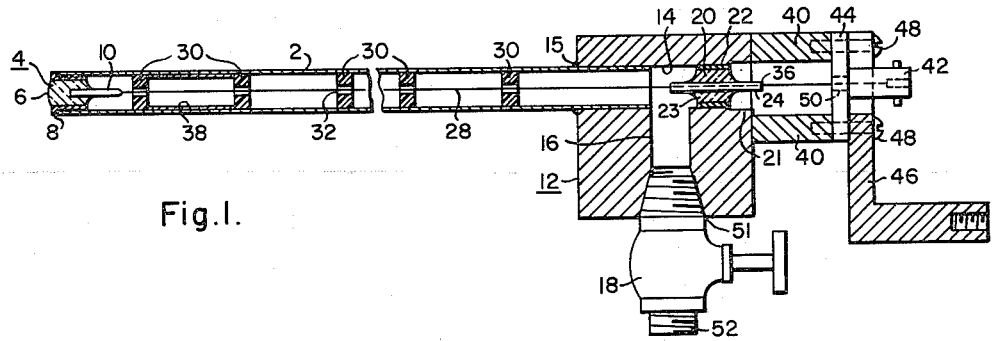
Fig.1.
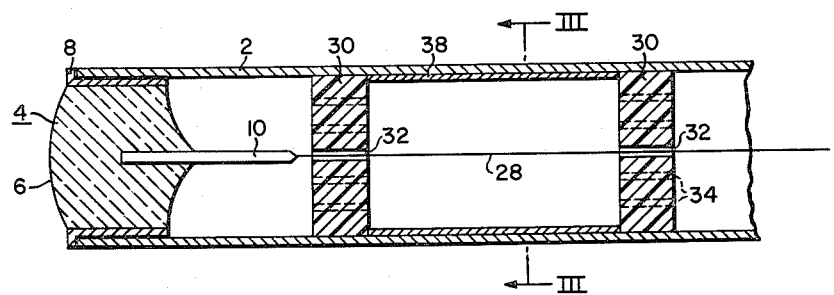
Fig.2.
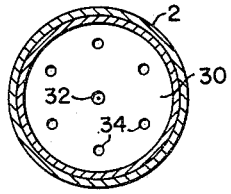
Fig.3.
Fig.7.
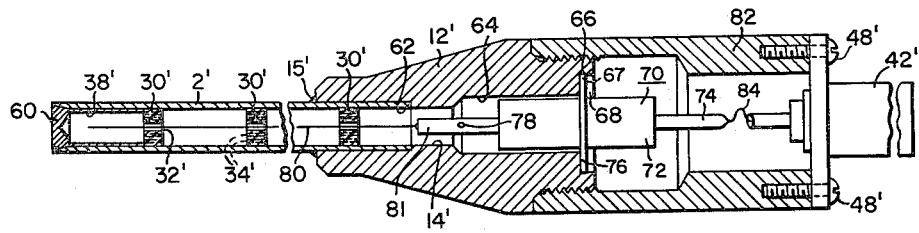
WITNESSES
Edwin E. Bander
Th. Hermer
INVENTOR
Thomas M. Ryan
BY
Donald Smith
ATTORNEY

United States Patent Office 3,028,517
Patented Apr. 3, 1962

3,028,517
NEUTRON DETECTOR
Thomas M. Ryan, Idaho Falls, Idaho, assignor, by mesne assignments, to the United States of America as represented by the United States Atomic Energy Commission
Filed Dec. 10, 1958, Ser. No. 779,421
4 Claims. (Cl. 313—61)

This invention relates to electric discharge apparatus and has particular relation to fission counters.

A fission counter is a pulse ionization chamber which is capable of detecting so-called thermal or slow neutrons by means of ionization pulses in a gas of the chamber produced by charged fission fragments resulting from fissioning a susceptible material by the neutrons. Thermal or slow neutrons are those which are most efficient in producing fission in the fissionable isotopes of certain elements, such for example as uranium or plutonium, the most common isotope being that of uranium having atomic weight 235, which will be called herein $U^{235}$. Neutrons impinging on this material induce fission, the fragments of which produce the ionization to be measured.

Fission counters are sometimes used to measure thermal neutron density and it is desirable that for such service they be highly sensitive. When used for this purpose, the fission counter is disposed in the immediate vicinity of the source of neutrons. This invention in its specific aspects concerns itself with a fission counter so disposed and is particularly useful for determining the amount of neutron flux at a particular point.

In certain applications, it is of particular importance to determine the neutron flux at certain points within the neutron source. It is frequently found that there is limited space to put a means for sampling this neutron flux at the points of interest. The prior art has solved the space problem by utilizing small foils or wires for sampling the flux. These foils are placed in the source and are then irradiated. After irradiation, the foils are removed, their activity measured and necessary corrections applied. The activity of the foils or wires is then calculated and is proportional to the flux at the location of the foils. The only advantage in the use of foils or wires is that they lend themselves well to detailed flux mapping because they are small and can be placed fairly close together in the neutron source. Their main disadvantages are that loading and unloading them into and out of the source is very difficult and time consuming. Long operating time is usually required to induce sufficient activity in the foil and much elaborate equipment is needed to measure the activity of the foils or wires. In addition, stability of the electronics for measuring the activity of the foils or wires must be well controlled over the period of time necessary to count all of the foils or wires used for making one flux mapping. A weight correction must be applied to the foil or wire data to take into account the non-uniform weight of the individual foils or wires. Additionally, if the material used for the foil or wire exhibits a relatively short half-life, a decay correction is necessary.

The use of a counter to determine the same information achieved with foils or wires has several advantages. The data from the counters is immediately available as no counting time is necessary. No decay or mass corrections are needed. The running or calculating time associated with counters is greatly reduced. If a mistake or a discrepancy is found, it is a small matter to repeat the measurement with a counter and this is not the case when foils or wires are utilized.

Accordingly, it is a primary object of this invention to provide a counter for detecting the neutron flux at a particular point in a confined area.

Another important object of this invention is to provide a detector for determining the neutron flux at a localized position.

A further object of this invention is to provide a neutron detector for determining neutron flux having a low internal capacitance.

Still another object of this invention is to provide a detector for determining neutron flux at a point having an output with a sharp pulse rise time.

A still further object of this invention is to provide a detector for determining the neutron flux at a point having an integral coaxial connection formed thereon which does not increase the internal capacitance of the detector.

In accordance with this invention there is provided an elongated, cylindrical, tubular casing of a small diameter having seals of insulating material located at the opposite ends thereof. An elongated wire is coaxially located in the casing and is maintained in insulated relationship with respect to the casing. A plurality of insulators are spacedly located along the length of the casing for supporting the center wire. The inner surface of a segment of the casing is coated with uranyl oxide which will herein be referred to as $U_3O_8$, in which the uranium is substantially enriched in the $U^{235}$ isotope. Preferably, the enrichment desirably is of the order of 90%, that is, the uranium of the compound instead of only having .7% $U^{235}$ has about 90% $U^{235}$. Intermediate the end seals of the casing, there is provided a gas connection whereby a suitable substantially inert gas such for example as argon having up to 3% by volume of nitrogen at 100 pounds per square inch is introduced to the casing.

The novel features that are considered characteristic of this invention are set forth generally above. The invention itself, both as to its organization and its method of operation, together with additional objects and advantages thereof will be understood from the following description of a specific embodiment when read in connection with the accompanying drawings, in which:

FIGURE 1 is a view in longitudinal section of an illustrative embodiment of this invention;

FIG. 2 is an enlarged view in longitudinal section of the counter sensitive region of the embodiment shown in FIG. 1;

FIG. 3 is a view in transverse section taken along the lines III—III of FIG. 2;

FIG. 7 is a view in longitudinal section of another illustrative embodiment of this invention.

Figure 6:
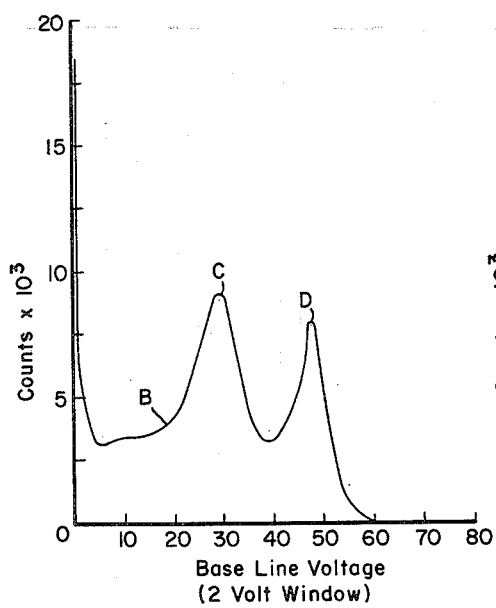
FIGS. 4, 5 and 6 are graphs illustrating the operating characteristics of the embodiment of this invention shown in FIGS. 1, 2 and 3.

Viewing the embodiment of this invention shown in FIGURES 1, 2 and 3, there is provided an elongated tubular casing 2 formed from a suitable material having a low neutron absorption cross-section such for example, as stainless steel or aluminum. The outer end of the casing 2 is enclosed with a suitable seal 4 formed in part of insulating material such as for example, as a ceramic insulating material. The seal 4 may comprise any conventional ceramic-metallic member having a central ceramic portion 6 and a metallic tubular portion 8 secured to the periphery thereof by conventional means. The ceramic portion 6 of the seal 4 is provided with a centrally located outwardly extending metallic stud 10 secured thereto and extending into the casing 2. The seal 4 may be secured to the casing 2 by fastening the metallic tubular portion 8 thereof to the outer end of the casing 2 by suitable means such as for example, as by seal welding or brazing. The seal 4 is constructed so that the stud 10 is maintained in insulated relationship with respect to both the metallic tubular portion 8 and the casing 2.

The inner end of the casing 2 is adapted to be located in a portion of an opening 14 in a support block 12 and is secured thereto by conventional means such for example, as seal welding or brazing as at 15. The support block 12 may be formed of any suitable material such as steel or brass and is provided with the opening 14 therein which is generally T-shaped. The cross bar portion of the T-shaped opening 14 extends entirely through the support block 12 and the stem 16 of the T-shaped opening 14 extends from one side wall of the support block 12 to the cross bar portion of the opening 14. As previously pointed out, the inner end of the casing 2 is located in one end of the cross bar portion of the opening 14.

The stem 16 of the T-shaped opening 14 is provided with a threaded portion adjacent the side wall of the support block 12 in which a valve 18 is threadedly mounted. The valve 18 is of a conventional construction and is utilized for evacuation and filling of the casing 2 with an inert atmosphere as will be hereinafter described. Another ceramic-metallic end seal 20 similar in form to the seal 4 is located in a portion 21 of the cross bar portion of the opening 14. The seal 20 is provided with a similar outer metallic casing 22, an intermediate ceramic portion 23 and a center stud 24 with the metallic casing 22 being secured to the block 12 by suitable means such for example, as by seal welding or brazing. The stud 24 extends entirely through the ceramic portion 26 of the seal 20 and is aligned with the stud 10 of the seal 4. Thus, it may be seen that the casing 2 may be hermetically sealed by the end seals 4 and 20 and by the valve 18 when the later is closed. An elongated lead 28 is located to extend along the center line of the casing 24 of the seals is supported therein by the studs 10 and 24 of the seals 4 and 20, respectively. The lead 28 is formed of an electrical conducting material and is preferably made of the same material as the casing 2 so that no differential expansion between the casing 2 and the lead 28 will place the lead 28 under extreme tension. The lead 28 is supported and maintained in its central position in the casing 2 by means of a plurality of spaced insulators 30 located in the casing 2. The insulators 30 are disk-shaped and may be formed from any insulating material such for example, as Teflon. The insulators 30 are preferably sized to be slightly larger in diameter than the casing 2 so that they are forced into predetermined positions within the casing 2 and are thereby maintained in these positions. Each of the insulators 30 is provided with a centrally located axially aligned opening 32 through which the lead 28 extends. The insulators 30 are additionally provided with a plurality of spaced axial openings indicated generally as 34 which cooperate to allow evacuation and pressurization of all portions of the casing 2.

The stud 24 of the seal 20 is provided with an axial opening extending entirely therethrough and through which the lead 28 extends. The lead 28 is joined to the stud 24 by suitable means such for example, as by welding or brazing at 36 whereby the axial opening in the stud 24 is completely sealed.

In this example, a coated foil 38 is located between and supported by two adjacent insulators 30 and engages the inner wall of the casing 2. The foil 38 may be formed of any suitable material such for example, as nickel on which there has been brushed or otherwise applied a uranyl oxide solution. The foil 38 may be prepared by brushing the uranyl oxide solution onto the inner side of the foil and by heating the foil until the liquid portion thereof evaporates and the $U_3O_8$ remains deposited on the surface thereof. To obtain the desired quantity of $U_3O_8$ and a uniform distribution of $U_3O_8$ on the foil, this process need merely be repeated until a sufficient amount of $U_3O_8$ has been uniformly deposited. The foil 38 is prevented from axial movement along the casing 2 by the insulators 30 and is prevented from radial movement therein by rolling the foil into a cylinder of a diameter less than the inner diameter of the casing 2, locating the foil in its appropriate position in the casing 2 and allowing the foil to expand due to internal spring forces until it flushly engages the inner surface of the casing 2.

The side wall of the block 12 adjacent the seal 20 is provided with a pair of spaced extensions 40 adjacent the opening 14 which may be formed of any suitable material such, for example, as the same material used in forming the block 12. The extensions 40 may be formed integrally with the block 12 or may be secured thereto by suitable means such, for example, as by brazing. A coaxial connector 42 having a base 44 is located on the outermost surface of the extensions 40 and an L-shaped mounting bracket 46 is located to engage the outwardly facing surface of the base 44 of the connector 42. The base 44 and the bracket 46 are provided with aligned openings therethrough which are also aligned with threaded openings in the extensions 40 so that the bracket 46 and connector 42 may be secured to the extensions 40 such as by screws 48 which extend through the aligned openings in the base 44, in bracket 48 and threadedly engage the opening in the extensions 40, respectively.

The coaxial connector 42 may be formed from any commercially available device having a central contact and an outer contact maintained in insulated relationship with respect to each other. The lead 28 is connected to the central contact of the connector 42 by suitable means such for example, as by welding or brazing. An opening 50 is provided in the base 44 of the connector 42 through which the lead 28 extends so that the latter remains in insulated relationship with respect to the outer contact of the connector 42. Thus, it may be seen that the casing 2 forms one contact for the detector and is connected to the outer contact of the connector 42 and the central contact of the connector 42 comprises the lead 28.

To assemble the counter, the foil 38 is located in a predetermined position and the insulators 30 are inserted through the open ends of the casing 2. The lead 28 is secured to the stud 10 of the end seal 4 and the lead 28 is passed through each of the central openings 32 in the insulators 30 until the free end of the lead 28 extends through the entire casing 2. The free end of the lead 28 is then pulled until the end seal 4 engages the outer end of the casing 2 and the metallic tubular portion 8 of the seal 4 is secured to the casing 2. The lead 28 is then passed through the cross bar portion of the T-shaped opening 14 of the mounting block 12 and the inner end of the casing 2 is inserted into the cross bar portion of the opening 14 until it rests in the position shown in FIGURE 1. The casing 2 is secured to the supporting block 12 by seal welding the outer periphery of the casing 2 to the support block 12 at 15. The free end of the lead 28 is passed through the opening in the stud 24 of the end seal 20 and the end seal 20 is moved along the lead 28 until it is located in the position shown in FIGURE 1. The end seal 20 is then secured to the support block 12 by welding the entire periphery of the metallic portion 22 thereof to the support block 12. The lead 28 can be then placed under a predetermined amount of tension by merely pulling the free end thereof and is secured to the stud 24 by welding at 38. The connector 42 and the mounting bracket 46 are secured to the extensions 40 of the support block 12 in the manner previously described and the free end of the lead 28 is secured to the central contact of the coaxial connector 42. The valve 18 is threaded into engagement with the stem portion of the opening 14 and if desirable a peripheral seal weld can be made between the valve 18 and the support block 12 at 51.

As previously indicated it is necessary to provide an ionizable atmosphere in the fission counter so that electrons may be stripped therefrom to form charged particles upon collision with fission fragments emitted from the $U_3O_8$ coating. Accordingly, the valve 18 is opened and the casing 2 is evacuated by suitable means such for example, as by connecting a vacuum pump to the outer end 52 of the valve 18. When the desired vacuum in the counter has been achieved the valve 18 is closed and a connection is made at the outer end 52 of the channel of the valve 18 to a container having the appropriate atmosphere therein. This atmosphere is preferably under pressure and the valve 18 is opened allowing the atmosphere to flow into the casing 2 until a desired pressure is obtained. The valve 18 is then closed and an operable counter has been constructed.

It has been found that one suitable atmosphere for the fission counter is argon with 1 to 3 percent nitrogen at a pressure of 100 pounds per square inch.

As pointed out previously, it is desirable to utilize the counter constructed in accordance with the present invention where available space is at a minimum. Counters have been constructed wherein the outer diameter of the casing 2 is 0.25 inch. For counters utilized in long narrow channels the length of the casing 2 has been made in excess of 50 inches; it is to be noted, however, that a counter of substantially any length may be formed and the length of the casing does not substantially effect its counting characteristics. Furthermore, counters of different casing diameters may be constructed without substantially effecting the characteristics thereof. In the embodiment shown in FIGURES 1 through 3 there is provided a fission counter wherein the atmosphere may be changed at any time. Furthermore, by merely changing the composition of the foil 38 the counter may be utilized to detect neutrons of any energy level. This can be achieved by utilizing a fissionable material on the foil 38 which has a high neutron capture cross section for neutrons of higher energy levels.

The internal capacitance of counters of the type described directly effects the pulse rise time of a counter and it is desirable to maximize the pulse rise time so that for a given interval of time a greater number of counts may be recorded. In order to maximize the pulse rise time of the counter, it is necessary to maintain the internal capacitance of the counter at a minimum. It has been determined that low capacitance counters are formed by this invention inasmuch as the capacitance of the counter described above has been measured to be 50 micromicro farads for a counter 50 inches in length.

Figure 4:
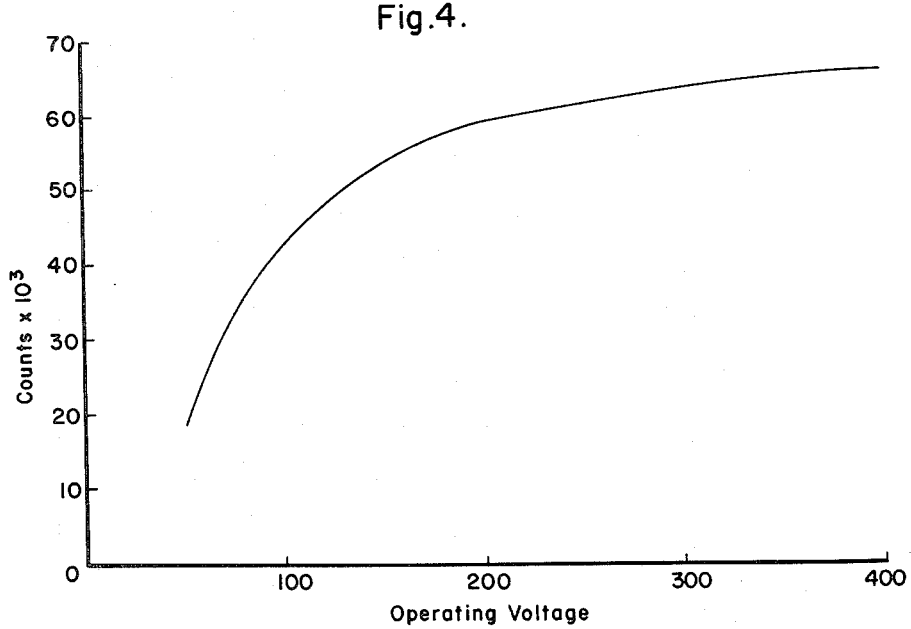

Viewing FIGURE 4 there is illustrated a graph of the variation in counts from a standard source of neutrons as the voltage between the lead 28 and the casing 2 is varied. It is to be noted that above approximately 200 volts there is very little increase in the number of counts for a small voltage variation so that when the counter is utilized at an operating voltage greater than 200 volts, any minor variation in voltage does not substantially effect the output of the counter. In practice it has been found desirable to operate the counter at 250 volts.

Figure 5:
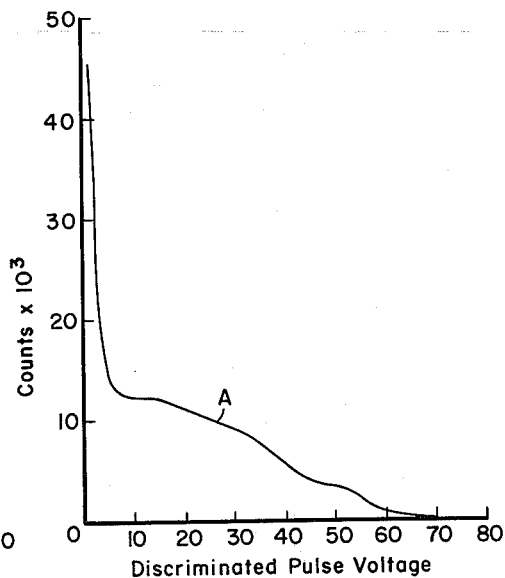

FIGURE 5 illustrates the response and sensitivity of counters constructed in accordance with the present invention. The horizontal scale indicates discriminated pulse voltage with the vertical scale indicating the number of counts $\times 10^3$. To perform this experiment a counter was placed at a fixed location with respect to a standard source of neutrons and the monitoring equipment for the counter was varied so that the counter would only detect pulses having a voltage greater than the discriminated pulse voltage. For example, point A on the graph shown in FIGURE 5 was determined by operating the counter so that it would detect pulses having a voltage greater than 20 volts and approximately 1100 counts were recorded by the counter in a unit time.

Viewing FIGURE 5 it may be noted that counters constructed in accordance with the principle of this invention are highly sensitive inasmuch as an increase in the discriminated pulse voltage caused a substantially direct reduction in the number of pulses detected by the counter.

FIGURE 6 illustrates the results of an experiment with the counter wherein the number of pulses detected within a two volt range from the base line voltage is compared with a variation in the base line voltage. This is commonly referred to as viewing the number of pulses seen by the counter through a "two volt window." Thus, the vertical scale of FIGURE 6 depicts the number of counts $\times 10^3$ and the original scale depicts the base line voltage. To perform the experiment, a counter was located at a fixed distance with respect to a standard source of neutrons and the operating equipment for the counter was adjusted so that the counter would discriminate against pulses having a voltage less than the base line voltage and would only record pulses having a voltage between the base line voltage and two volts greater than the base line voltage. For example, for the determination of point B, the base line voltage was made to be 20 volts and the 2 volt window detected pulses having a voltage between 20 and 22 volts. For the counter operated under these conditions, approximately 4000 pulses were detected within this range in a unit time. Utilizing a $U_3O_8$ foil it has been determined that the fission fragments produced by the $U_3O_8$ are grouped in two groups, one of 60 m.e.v. and the other of 90 m.e.v. Points C and D illustrate a peak number of counts which corresponds to the two groups of fission fragments.

There is illustrated in FIGURE 7 another illustrative embodiment of this invention which has been constructed to overcome certain disadvantages of the embodiment shown in FIGS. 1 through 3. Accordingly, like parts will be designated by the same reference characters primed.

Thus, there is provided an elongated tubular casing 2' formed from the same material as the tubular casing 2. An end seal 60 is provided to close the outer end of the casing 2' and may be formed of any suitable material such, for example, as an alloy of copper. The outer end of the casing 2' is preferably tapered and the periphery of the end seal 60 is also correspondingly tapered so that a close fit between the seal 60 and the casing 2' is provided. The seal 60 is secured to the outer end of the casing 2' by suitable means such for example as by seal welding or brazing. A foil 38' formed from the same material as the foil 38 is located adjacent the outer end of the casing 2' in the same manner as the foil 38. The casing 2' is provided with a plurality of spaced insulators 30' having central axial openings 32' therethrough and spaced axial openings 34' which aid in evacuating and pressurizing the casing 2'.

A support block 12' is provided with an elongated opening 14' therethrough and the inner end of the casing 2' is located in a portion of the opening 14' with the casing 2' secured thereto by suitable means such for example, by brazing or seal welding at 15'. An outwardly facing shoulder 62 is provided in the opening 14' adjacent one end of the support block 12' and the inner end of the casing 2' is inserted into the opening 14' until the end surface thereof engages the shoulder 62. The opening 14' is provided with an enlargement 64 adjacent the outer end thereof which terminates in another enlargement 68 so that the enlargements 64 and 68 provide an outwardly facing shoulder 66 therebetween.

A ceramic-metallic seal 70 is provided with a cylindrical ceramic portion 72 having a centrally located hollow metallic stud 74 extending completely therethrough. An annular metallic flange or eyelet 76 is secured to the outer surface of the ceramic portion 72 and is adapted to the outer surface of the ceramic portion 72 and is adapted to rest on the shoulder 68 of the support block 12'. The portion of the hollow metallic stud 74 adjacent the casing 2' is provided with a small opening 78 in the side wall thereof to allow the evacuation and pressurization of the casing 2' in the manner hereinafter described. A center lead 80 constructed of an electrical conducting material is provided to function in the same manner as the lead 28. The lead 80, however, is formed to be a rigid member such for example, as a steel drill rod of 30 mils outside diameter and is secured to the inner end of the stud 74 by suitable means such for example, as by brazing at 81. The lead 80 is formed of a length so that the outer end thereof is spaced from the seal 60 and is maintained in position by the central openings 32' and the insulators 30'. The ceramic-metallic seal 70 is secured to the support block 12' by suitable means such for example, as by seal welding or brazing at 67. An annular cover 82 is provided to enclose the outer end of the seal 70 and threadedly engages the outer end of the support block 12'. The cover 82 is preferably formed from an electrical conducting material and there is provided a coaxial connector 42' mounted on the outer end thereof by suitable means such for example, as by screws 48'. The outer end of the hollow stud 74 is enclosed and sealed or tipped off. A conductor 84 is connected between the outer end of the stud 74 and the central contact of the coaxial connector 42'.

To assemble the counter shown in FIG. 7 the insulators 30' are inserted to predetermined locations along the length of the casing 2'. The foil 38' is inserted through the outer end of the casing 2' until it engages the outwardly facing surface of the adjacent insulator 30'. The end seal 60 is inserted in position and secured to the casing 2'. Thus, the foil 38' is prevented from moving axially along the casing 2' by the adjacent insulator 30' and the end seal 60. The inner end of the casing 2' is inserted into the opening 14' in the support block 12' until the end edge thereof engages the shoulder 62 in the support block 12' and the casing 2' is secured to the support block 12' in the manner previously indicated. The central lead 80 is secured at its inner end to the stud 74 of the seal 70 and the central lead 80 and the seal 70 are inserted into the outer end of the support block 12' until the flange 76 engages the shoulder 66. In inserting the lead 80 and the seal 70, care must be exercised to ensure that the lead 80 passes through the openings 32' in each insulator 30'. The seal 70 is then secured to the support block 12 by seal welding or brazing at 67. The outer end of the stud 74 is then connected to a vacuum pump and the casing 2' is evacuated.

In the event the inner end of the stud 74 is completely enclosed when the lead 80 is secured thereto, evacuation of the casing 2' takes place through the opening 78. The casing 2' is then pressurized with a suitable atmosphere and the outer end of the stud 74 is tipped off. The cover 82 is threadedly secured to the support block 12 and the conductor 84 is secured between the outer end of the stud 74 and the central contact of the connector 42'. Finally, the connector 42' is mounted on the outer end of the cover 82.

It is to be noted that in this embodiment of the present invention the lead 80 is not secured at both ends so that differential expansion between the lead 80 and the casing 2' cannot create any tensional stresses in the lead 80 so that any danger of creating a break in the lead 80 is prevented. Furthermore, the relatively expensive ceramic-metallic end seal has been eliminated and there has been substituted an ordinary metallic end seal 60. Furthermore, the use of the metallic end seal 60 allows more rugged handling of the counter inasmuch as the end seal 4 is susceptible to breakage if not used properly.

It is to be understood that the foregoing description merely relates to specific embodiments of this invention and it will be seen that numerous changes can be made therein without departing from the broad spirit and scope of the invention. Accordingly, it is specifically intended that the foregoing be interpreted as illustrative and not in a limiting sense.

I claim as my invention:

1. An electric discharge device capable of detecting the presence of neutrons comprising, an elongated sealed tubular casing formed from an electrical conducting material and having an ionizable atmosphere therein, a foil member having uniformly distributed fissionable material thereon and bent in a circular form that resiliently engages the inner surface of an axial segment of said casing, the axis of said form coinciding with the axis of said casing, a plurality of axially spaced insulators located in said casing and each having an opening therethrough which is coaxially aligned with respect to said casing, at least one of said insulators engaging said foil member to maintain the latter in its axial position and a lead wire located in said openings and maintained in insulated relationship with respect to said casing.

2. An electric discharge device capable of detecting the presence of neutrons comprising, an elongated sealed tubular casing formed from an electrical conducting material and having an ionizable atmosphere therein, a coiled resilient member containing fissionable material resiliently engaging the inner surface of an axial segment of said casing to ensure the flush seating of said member against said casing segment, the axis of said member coinciding with the axis of said casing, means preventing an axial movement of said member in said casing, and a coaxial conductor located in said casing and maintained in insulated relationhip with respect thereto.

3. An electric discharge device capable of detecting the presence of neutrons comprising, an elongated sealed tubular casing formed from an electrical conducting material and having an ionizable atmosphere therein, a resilient foil member containing fissionable material and bent in a circular form that resiliently engages the inner surface of an axial segment of said casing, the axis of said form coinciding with the axis of said casing, a plurality of self-supporting axially spaced insulators located in said casing and formed of a size to frictionally engage the interior of said casing, each of said insulators having an opening therethrough which is coaxially aligned with respect to said casing, a lead wire located in said openings and maintained in insulated relationship with respect to said casing, and at least one of said insulators engaging an edge of said member to prevent axial movement of said member along said casing.

4. In an electric discharge device, the combination comprising a tubular metallic housing, means for hermetically sealing said housing, said sealing means including a metallic end plug secured to one of the open ends of said housing, a resilient foil member comprising neutron reactive material disposed in said housing adjacent said one end thereof and abutting said end plug and bent in a circular form that resiliently engages the interior side wall of said housing, a plurality of self-supporting axially spaced insulating discs disposed in said housing and frictionally engaging said interior side wall thereof, the insulating disc located adjacent said one housing end being disposed to engage said foil to maintain the latter in axial alignment, a central electrode disposed in said housing, each of said discs having a centrally disposed axial opening extending therethrough located to receive said wire and to maintain the latter in spaced relationship with respect to said housing, and at least a portion of said electrode being co-extensive with a portion of said foil.

References Cited in the file of this patent

UNITED STATES PATENTS

| | | |
|---|---|---|
| 2,408,230 | Shoupp | Sept. 24, 1946 |
| 2,519,007 | Wilson | Aug. 15, 1950 |
| 2,542,440 | Victoreen et al. | Feb. 20, 1951 |
| 2,742,586 | Friedman | Apr. 17, 1956 |
| 2,761,071 | Hurst | Aug. 28, 1956 |
| 2,776,390 | Anton | Jan. 1, 1957 |
| 2,809,313 | Baer | Oct. 8, 1957 |